United States Patent Office 2,748,379
Patented May 29, 1956

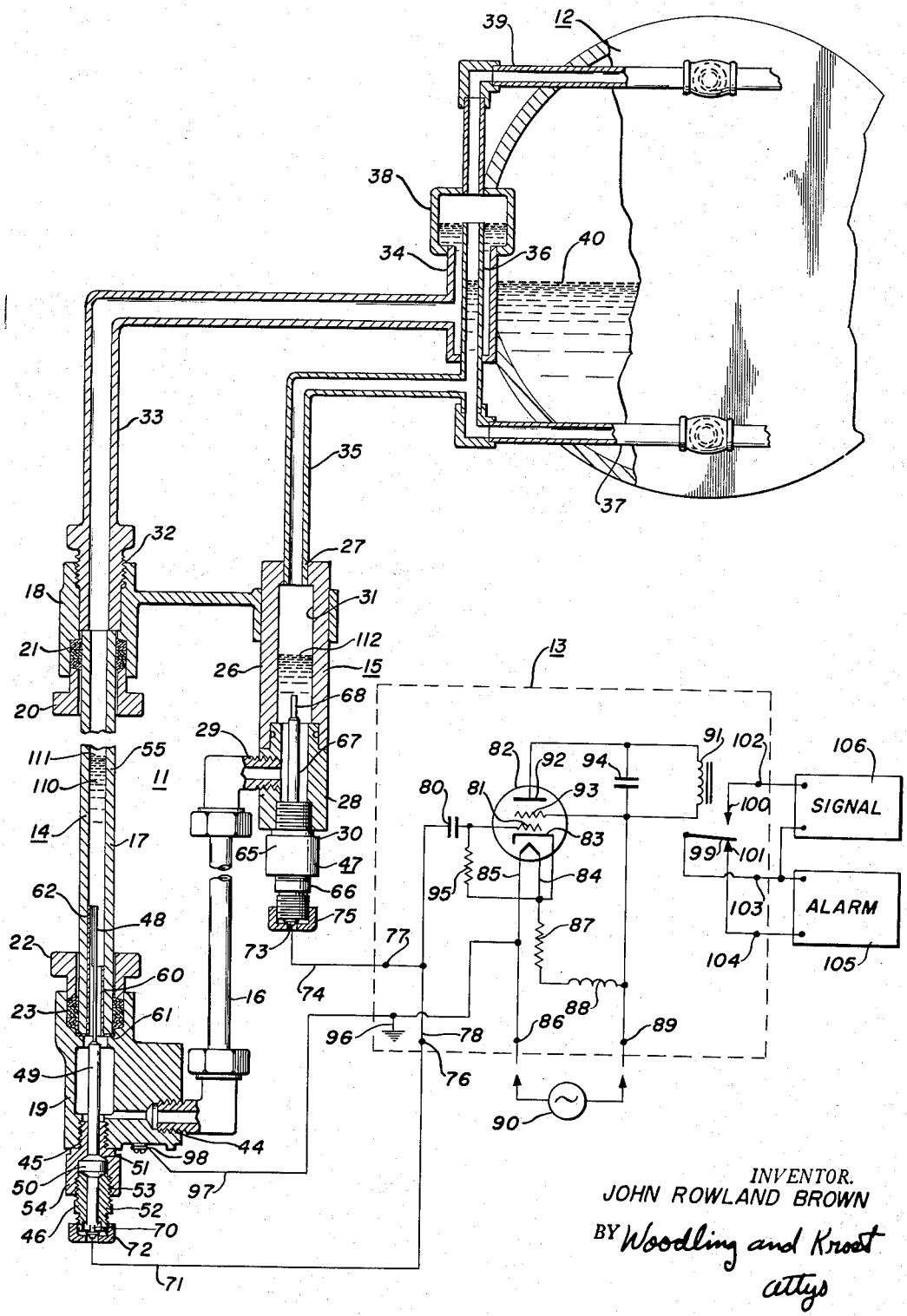

2,748,379

LONG PROBE MANOMETER

John Rowland Brown, Cleveland, Ohio, assignor to The Reliance Gauge Column Company Application May 5, 1953, Serial No. 353,159

13 Claims. (Cl. 340—244)

The invention relates in general to manometers or devices for hydrostatically indicating the level of a liquid in a reservoir and more particularly to a remote reading manometer which may contain two liquids of different specific gravities and electrical resistivities with long electrical probes disposed at different points in the manometer and adapted to contact both liquids to obtain different electrical impedances between the probes and a return current conductor so that an electrical indication may be obtained as to the level of the liquid in the reservoir.

The prior art remote reading indicators have utilized two different liquids having different electrical resistivities so as to obtain a changed electrical impedance between a probe and ground as the meniscus between two liquids varied in position relative to the probes. In steam boilers and the like, the water in the boiler is adapted to be contaminated with various foreign substances which may cling to the probe or the insulation on the probe and thus give a false indication.

An object of the invention is to provide a gauge which is more accurate and positive in action than previous devices.

Another object of the invention is to provide a liquid level gauge or remote indicating manometer wherein there is considerably less chance for obtaining a false indication or alarm, as to the level of the liquid.

Still another object of the invention is to provide a liquid level gauge and indicator wherein considerably less maintenance is required to keep the gauge in operating condition.

A further object of the invention is to provide a liquid level gauge with long, thin probes insulated by relatively long insulating sleeves to inhibit the possibilities of foreign substances lodging on the probe or sleeve and giving a false alarm.

Other objects and a fuller understanding of the invention may be had by referring to the following description and claims, taken in conjunction with the accompanying drawing, in which:

The single figure of the drawing shows the construction of a liquid level gauge and the schematic connections to a reservoir and an electrical indicator.

The drawing shows a manometer 11 hydrostatically connected to a reservoir 12 and electrically connected to an electric indicator 13. The manometer 11 has a generally U shape with a first leg 14 and a second leg 15 interconnected by an offset conduit 16. The first leg 14 includes a glass gauge tube 17, a top housing 18 and a bottom housing 19. The glass gauge tube 17 is a precision bored tube which has a calibrated diameter. The top housing 18 is connected to the upper end of the tube 17 by a packing nut 20 and packing 21. Similarly, the bottom housing 19 is connected to the lower end of the tube 17 by a packing nut 22 and packing 23.

A calibration tube 26 has an upper opening 27 and a lower plug 28. The plug 28 has a side opening 29 and a bottom opening 30, which is tapped concentrically with the bore 31 of the calibration tube 26. The top housing 18 has an upper opening 32. The upper opening 32 is connected by a conduit 33 to an outer tube 34. The upper opening 27 of the calibration tube 26 is connected by a conduit 35 to an inner tube 36. The inner tube 36 is concentric with the outer tube 34. The inner tube 36 is connected with the interior of the reservoir 12 at the bottom by a conduit 37. The upper end of the inner tube 36 is disposed within a condensing chamber 38, which is also connected with the top of the outer tube 34.

The condensing chamber 38 is connected by a conduit 39 to the upper portion of the reservoir 12. The reservoir 12 may be, for example, a steam boiler having a normal water level indicated by the line 40. This water level line also appears in the inner tube 36. The upper end of the inner tube 36 is disposed at the high water level in the reservoir 12. The condensing chamber 38 is normally full of water which would be the condensate with overflow of the condensate running into the inner tube 36. It will thus be noted that the outer tube 34 has a higher water column therein than the inner tube 36 to thus create a differential water pressure on the conduits 33 and 35 which is greater on the conduit 33. This differential water pressure is utilized in the manometer 11 to obtain a remote reading or indication.

The bottom housing 19 has a side opening 44 and a bottom opening 45 which is tapped concentrically with the bore of the glass gauge tube 17. The offset conduit 16 interconnects the side openings 29 and 44. The bottom openings 45 and 30 are adapted to receive electrical probes 46 and 47, respectively. The first probe 46 includes a long conducting rod 48 insulated at the lower end by an insulating sleeve 49. The insulating sleeve 49 has an enlarged head 50 having tapered shoulders 51. The insulating sleeve 49 may be of suitable insulation to withstand the heat and pressure and in this case is slightly resilient so that a packing nut 52 may engage threads 53 of a probe housing 54 and engage the shoulders 51 to squeeze the sleeve 49 upon the rod 48. This makes a suitable seal to withstand the heat and pressure. A suitable insulation is that marketed under the trademark "Teflon," which is a fluoride compound. It is understood that other suitable insulating materials may be used, for example, porcelain, and other methods of sealing the rod 48 to the insulating sleeve 49 may be utilized. The probe housing 54 threadably engages the threaded opening 45.

The insulating sleeve 49 extends for a distance approximately six times its diameter and extends almost to the bottom of the glass gauge 17. The conducting rod 48 extends up into the glass gauge 17 for a considerable distance and into the sight portion 55 of the tube 17. A ground sleeve 60 of electrically conducting material is snugly disposed within the gauge tube 17. This ground sleeve has a flange 61 at the lower end thereof engaging the bottom housing 19 to make an electrical connection therewith. The sleeve 60 also has a portion thereof cut away to form an upwardly extending finger 62. The portion of the sleeve which is cut away provides that an operator may see through the glass gauge 17 even at the lower portion thereof to visibly determine the level of the meniscus therein.

The second probe 47 has a probe housing 65 into which a packing nut 66 is screwed to clamp an insulator sleeve 67 on to a second conducting probe 68. The construction of the probe 47 is thus similar to the construction of the first probe 46. The probe housing 65 is screwed into the opening 30 and the conducting rod 68 extends up into the bore 31 of the calibration tube 26. The insulator sleeve 67 extends for a length approximately six times its diameter and extends for substantially the full length of the lower plug 28. The top of the insulator sleeve 67 is generally on a level with the top of the sight portion 55 of the tube 17 and thus the second probe 47 is a high water level probe.

Calibration tubes 26 of different volumes may be utilized to obtain an accurate reading on the glass gauge 17 with different water level ranges in the reservoir 12.

The conducting rod 48 extends through the packing nut 52 to a central terminal 70. This central terminal is connected to a conductor 71 by a connector 72 threaded onto the packing nut 52. Similarly, the conducting rod 68 has a central terminal 73 on the outer end thereof which is connected to a conductor 74 by a connector 75. The conductors 71 and 74 are connected to terminals 76 and 77, respectively, on the electric indicator 13. An internal conductor 78 interconnects these two terminals. The conductors 78 connects through a grid condenser 80 to a control grid 81 of an amplifier tube 82. The amplifier tube 82 has a cathode 83 and filament leads 84 and 85. The filament lead 85 is connected to a terminal 86 and the filament lead 84 is connected through a voltage dropping resistance 87 and choke 88 to a terminal 89. The terminals 86 and 89 are adapted to be energized from an alternating current source 90. A relay 91 is connected between the anode 92 and screen grid 93 of the amplifier tube 82. A condenser 94 is connected in parallel across the relay 91. A grid leak resistor 95 interconnects the control grid 81 and cathode 83. The terminal 86 is grounded as shown by the ground connection 96 and this is connected by a conductor 97 to a ground terminal 98 on the bottom housing 19.

The relay is shown in its de-energized position and controls a contact armature 99 connectable with a contact 100 when energized and with a contact 101 when de-energized. The contact 100 is connected to a terminal 102; the contact armature 99 is connected to a terminal 103; and the contact 101 is connected to a terminal 104. The terminals 103 and 104 are connected to an alarm device 105 and the terminals 102 and 103 are connected to a signal device 106.

Operation

The manometer 11 is a device which utilizes a differential pressure to indicate a level of a liquid in the reservoir 12 and this indication is both a visual indication on the sight portion 55 and an electric indication on the indicator 13. The reservoir 12 has been described by way of example as a steam boiler having a normal water line 40. Condensate of the steam fills the condensing chamber 38 to the level of the top of the inner tube 36. Thus, a greater water pressure is maintained on the outer tube 34 than on the inner tube 36. The outer tube 34 is connected to the first leg 14 of the manometer 11 and the inner tube 36 is connected to the second leg 15. The manometer 11 is adapted to be filled with manometer fluid 110 which for normal water levels has a meniscus 111 at the middle of the sight portion 55 and this meniscus at the junction of the manometer fluid 110 and water, such as boiler water or distilled water. The manometer fluid 110 has a second meniscus 112 approximately midway of the length of the calibration tube 26. This again is a meniscus of a junction with the manometer fluid and water.

The manometer fluid 110 has a specific gravity considerably greater than water or greater than the liquid in the reservoir 12 and has an electrical resistance approximately 20 times as great as distilled water. A suitable manometer fluid for this purpose is manufactured and sold under the trade name "Vizzene" which has a base either of bromine, bromo benzene or halogenated alkyl benzene.

If the water level rises in the reservoir 12, the water level in the inner tube 36 will also rise. This will decrease the differential water pressure and hence the differential between the two meniscuses 111 and 112 will decrease in order to maintain a hydrostatic balance. The meniscus 111 will rise and the meniscus 112 will fall, since the amount of manometer fluid necessary remains constant. If the water level rises to a sufficient height, the meniscus 112 will fall below the top of the conducting rod 68. This will permit water to contact the conducting rod 68, as well as the calibration tube 26. Since water has only about one-twentieth (1/20) the resistance of the manometer fluid, this means a considerably lower resistance will be present across the conductors 74 and 97. Previously, with the electric indicator 13 operating, the amplifier tube 92 would be energized. With the water now in contact with the conducting rod 68, this places a considerably lower impedance between the ground 96 and the grid condenser 80. This changes the bias condition of the amplifier tube 82 such that it no longer is biased to conduct. The relay 91 will be de-energized and the contact armature 99 will drop to make connection with the contact 101 and thus close the circuit to the alarm device 105. This alarm device may be a red light, a siren, or anything suitable to the purpose. When the water level is normal in the reservoir 12, the amplifier tube 82 will be conducting, the relay 91 will be energized, and hence a circuit will be closed to the signal device 106. This may be a green light, or anything suitable to indicate that the water level is within the permissible range.

If the water level in the reservoir 12 should fall, the meniscus 111 would pass downwardly over the conducting rod 48. Water would then bridge the conducting rod 48 and ground sleeve 60, which again will cause a considerably lower impedance from ground to grid condenser 80. This likewise will bias the amplifier tube 82 so that it will be non-conducting and again actuate the alarm device 105. The electric indicator 13 has been shown and described merely as one operative embodiment and it would be obvious that the two probes 46 and 47 may be connected to separate alarm signals, if desired, to indicate low and high water conditions separately.

The principal difficulty with previous remote indicating manometers which included electrical probes was that the conductor portions of the probes and/or the insulator portions of the probes could easily be contaminated by foreign substances and cause a false indication or alarm. The prior art form of probes had a short length both in the insulator and in the conductor. When used with steam boilers or other liquid reservoirs, rust and scale are good examples of such foreign substances which find their way into the manometer. In the prior art devices, one small speck of foreign substance on the insulator portion of the probe could short out the probe sufficiently to give a false indication of low or high liquid level conditions. Similarly, a small bit of rust or scale bridging the conductor and ground connections could cause a short circuit which would give a false indication. Distilled water is normally thought of as being a good insulator and with the manometer fluid used, which is still a much better insulator, namely, about 20 times as high as water, it will be seen that even a fairly high resistance of 50,000 ohms presented by some foreign substance will cause a false indication. The present invention has eliminated this troublesome cause of false indications by providing a length of insulator sleeve which is approximately six times the diameter thereof so that it cannot be bridged by any scale, rust or other foreign substance. Further, the conducting rods 48 and 68 have been made quite long with the conducting rod 48 especially being of a length that it extends up into the sight portion 55.

Still further, the probes extend longitudinally of the calibrated bores of the glass tube 17 or calibration tube 26 and hence movement of the manometer fluid and/or water in the manometer 11 will be longitudinal of the probes to keep them washed clean. There is thus no transverse protuberance or indentation of the conducting rod 48 and extending finger 62, for example, which would catch or hold small particles of scale or rust. The entire manometer and indicating system may thus remain in operating condition for considerably longer periods of time before maintenance and cleaning are required than for prior art devices. The entire indicating system is thus more accurate in its response and more positive as to the indication of the water level, and there is considerably less chance for a wrong indication of water level.

It will be apparent that the electric indicating system may be utilized with a liquid level gauge device other than a manometer, since it could be connected to a direct reading rather than a remote indicating device. Still further, the probe 48 need not be disposed within a glass tube 17, but may be placed within a metal conducting tube the same as the probe 47 is placed in the calibration tube 26. This is true because the electrical indication and the visual indication are independent functions.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A gauge adapted for electrical connection to an indicator mechanism and hydrostatic connection to a reservoir for electrically indicating the liquid level in said reservoir, said indicator mechanism being responsive to a change in electrical impedance on the input thereof, said gauge comprising a generally U-shaped housing having first and second generally upright legs and an offset fluid connection therebetween, first and second surfaces defining generally upright calibration bores in said first and second legs, respectively, first and second openings in the bottom of said first and second legs and substantially concentrically aligned with said bores, the bottom of said first leg being at a level below that of the bottom of said second leg, said offset fluid connection interconnecting the interior of said bores at locations other than at said openings, the wall of said second calibration bore being electrically conductive, a first probe concentrically disposed in said first opening of said housing, said probe including a conducting rod extending into said first calibration bore and an insulating sleeve concentrically surrounding said rod for a distance substantially greater than the diameter of said sleeve, a conducting ground sleeve connected to said housing and surrounding part of and spaced from said rod for substantially the entire exposed length thereof, a second probe concentrically disposed in said second opening of said housing, said second probe including a second conducting rod extending into said second calibration bore and a second insulating sleeve concentrically surrounding said second rod for a distance substantially greater than the diameter of said sleeve, said ground sleeve and the wall of said second calibration bore being connectable to a common conductor, said probes and said common conductor adapted to be connected to said indicator mechanism input, both of said probes adapted to be contacted by first and second fluids having different electrical impedances in accordance with different liquid levels in said reservoir, said fluids subject to being contaminated by foreign substances, and movement of said fluids being longitudinal of said rods and sleeves to wash clean said probes of foreign substances to inhibit false indications.

2. A gauge adapted for electrical connection to an indicator mechanism and hydrostatic connection to a reservoir for electrically indicating the liquid level in said reservoir, said indicator mechanism being responsive to a change in electrical impedance on the input thereof, said gauge comprising a generally U-shaped housing having first and second generally upright legs and an offset fluid connection therebetween, first and second surface defining generally upright calibration bores in said first and second legs, respectively, first and second threaded openings in the bottom of said first and second legs and substantially concentrically aligned with said bores, the bottom of said first leg being at a level below that of the bottom of said second leg, said offset fluid connection interconnecting the interior of said bores at locations other than at said threaded openings, the wall of said second calibration bore being electrically conductive, a low level probe concentrically threaded in said first opening of said housing, said probe including a conducting rod extending into said first calibration bore and an insulating sleeve concentrically surrounding said rod for a distance greater than the diameter of said sleeve, a conducting ground sleeve connected to said housing and surrounding part of and spaced from said rod for substantially the entire exposed length thereof, a high level probe concentrically threaded in said second opening of said housing, said high level probe including a second conducting rod extending into said second calibration bore and a second insulating sleeve concentrically surrounding said second rod for a distance greater than the diameter of said sleeve, the top of said second insulating sleeve being substantially on a level with the top of said first leg, said ground sleeve and the wall of said second calibration bore being connectable to a common conductor, said high and low level probes and said common conductor adapted to be connected to said indicator mechanism input, both of said probes being adapted to be immersed in a first liquid having a relatively high specific gravity for normal liquid levels in said reservoir, said low and high probes adapted to be contacted by a second liquid having a relatively lower specific gravity for low and high, respectively, liquid levels in said reservoir, said first and second liquids having different electrical resistivities, said liquids subject to being contaminated by foreign substances, and movement of said liquids being longitudinal of said rods and sleeves to wash clean said probes of foreign substances to inhibit false indications.

3. A gauge adapted for electrical connection to an indicator mechanism and hydrostatic connection to a reservoir for electrically indicating the liquid level in said reservoir, said indicator mechanism being responsive to a change in electrical impedance on the input thereof, said gauge comprising a generally U-shaped housing having first and second generally vertical legs and an offset fluid connection therebetween, first and second surface defining generally vertical calibration bores in said first and second legs, respectively, first and second threaded openings in the bottom of said first and second legs and substantially concentrically aligned with said bores, the bottom of said first leg being at a level below that of the bottom of said second leg, said offset fluid connection interconnecting the interior of said bores at locations other than at said threaded openings, the wall of said second calibration bore being electrically conductive, a low level probe vertically and concentrically threaded in said first opening of said housing, said probe including a conducting rod extending into said first calibration bore and an insulating sleeve concentrically surrounding said rod for a distance substantially six times the diameter of said sleeve, a conducting ground sleeve connected to said housing and surrounding part of and spaced from said rod for substantially the entire exposed length thereof, a high level probe vertically and concentrically threaded in said second opening of said housing, said high level probe including a second conducting rod extending into said second calibration bore and a second insulating sleeve concentrically surrounding said second rod for a distance substantially six times the diameter of said sleeve, the top of said second insulating sleeve being substantially on a level with the top of said first leg, said ground sleeve and the wall of said second calibration bore being connectable to a common conductor, said high and low level probes and said common conductor adapted to be connected to said indicator mechanism input, both of said probes adapted to be immersed in a first liquid having a relatively high specific gravity for normal liquid levels in said reservoir, said low and high probes adapted to be contacted by a second liquid having a relatively lower specific gravity for low and high, respectively, liquid levels in said reservoir, said first and second liquids having different electrical resistivities, said liquids subject to being contaminated by foreign substances, and movement of said liquids being longitudinal of said rods and sleeves to wash clean said probes of foreign substances to inhibit false indications.

4. A remote indicating manometer adapted for electrical connection to an alarm mechanism and hydrostatic connection to a tank for electrically indicating the liquid level in said tank, said alarm mechanism being responsive to a change in electrical impedance on the input thereof to effect an alarm signal, said remote indicating manometer comprising a gauge tube, a top and a bottom housing connected to the ends of said gauge tube, a calibration housing having an upper opening and a bottom plug having lower and lower side openings, said bottom housing having lower and side openings, a conduit interconnecting said two side openings, said upper opening and said top housing adapted to be hydrostatically connected to said tank for obtaining a differential hydrostatic pressure, said calibration housing having a surface defining a precision bore, said lower openings being substantially concentric with the bores in said gauge tube and calibration housing, respectively, a first probe concentrically disposed in said lower opening of said bottom housing, said probe including a conducting rod extending into said gauge tube and an insulating sleeve concentrically surrounding said rod throughout substantially the entire length of said bottom housing, a conducting ground sleeve connected to said bottom housing and surrounding part of and spaced from said rod for substantially the entire exposed length thereof, a second probe concentrically disposed in said bottom plug lower opening of said calibration housing, said second probe including a second conducting rod extending into said calibration bore and a second insulating sleeve concentrically surrounding said second rod throughout substantially the entire length of said bottom plug, said bottom housing, bottom plug, and calibration housing being electrically connectable to a common conductor, said first and second probes and said common conductor adapted to be connected to said alarm mechanism input, both of said probes adapted to be immersed in a first liquid having a relatively high specific gravity for normal liquid levels in said tank, said probes adapted to be contacted by a second liquid having a relatively lower specific gravity for different liquid levels in said tank, said first and second liquids having different electrical resistivities, said liquids subject to being contaminated by foreign substances, and movement of said liquids being longitudinal of said rods and sleeves to wash clean said probes of foreign substances to inhibit false alarms.

5. A remote indicating manometer adapted for electrical connection to an alarm mechanism and hydrostatic connection to a tank for electrically indicating the liquid level in said tank, said alarm mechanism being responsive to a change in electrical impedance on the input thereof to effect an alarm signal, said remote indicating manometer comprising a glass gauge tube, a top and a bottom housing connected to the ends of said gauge tube to establish a sight portion of said tube, a calibration housing having an upper opening and a bottom plug having lower and lower side openings, said bottom housing having lower and side openings, a conduit interconnecting said two side openings, said upper opening and said top housing adapted to be hydrostatically connected to said tank for obtaining a differential hydrostatic pressure with lesser pressure at said calibration housing, said calibration housing having a surface defining a precision bore, said lower openings being substantially concentric with the bores in said gauge tube and calibration housing, respectively, a low level probe concentrically disposed in said lower opening of said bottom housing, said probe including a conducting rod extending into said gauge tube and an insulating sleeve concentrically surrounding said rod throughout substantially the entire length of said bottom housing, a conducting ground sleeve connected to said bottom housing and surrounding part of and spaced from said rod for substantially the entire exposed length thereof, a high level probe concentrically disposed in said bottom plug lower opening of said calibration housing, said high level probe including a second conducting rod extending into said calibration bore and a second insulating sleeve concentrically surrounding said second rod throughout substantially the entire length of said bottom plug, the top of said bottom plug and the top of said second insulating sleeve being substantially on a level with the top of said sight portion, said bottom housing, bottom plug, conduit and calibration housing being electrically connectable to a common conductor, said high and low level probes and said common conductor adapted to be connected to said alarm mechanism input, both of said probes adapted to be immersed in a first liquid having a relatively high specific gravity for normal liquid levels in said tank, said low and high level probes adapted to be contacted by a second liquid having a relatively lower specific gravity for low and high, respectively, liquid levels in said tank, said first and second liquids having different electrical resistivities, said liquids subject to being contaminated by foreign substances, and movement of said liquids being longitudinal of said rods and sleeves to wash clean said probes of foreign substances to inhibit false alarms.

6. A remote indicating manometer adapted for electrical connection to an alarm mechanism and hydrostatic connection to a tank for electrically and visually indicating the liquid level in said tank, said alarm mechanism being responsive to a change in electrical impedance on the input thereof to effect an alarm signal, said remote indicating manometer comprising a vertically disposed calibrated precision bored glass gauge tube, a top and a bottom housing connected to the ends of said gauge tube to establish a sight portion of said tube, a calibration housing having an upper opening and a bottom plug having lower and lower side openings, said bottom housing having lower and side openings, a conduit interconnecting said two side openings, said upper opening and said top housing adapted to be hydrostatically connected to said tank for obtaining a differential hydrostatic pressure with lesser pressure at said calibration housing, said calibration housing having a surface defining a precision bore disposed vertically, said lower openings being tapped substantially concentrically with the bores in said gauge tube and calibration housing, respectively, a low level probe vertically and concentrically threaded in said tapped lower opening of said bottom housing, said probe including a conducting rod extending into said sight portion and an insulating sleeve concentrically surrounding said rod throughout substantially the entire vertical length of said bottom housing, a conducting ground sleeve connected to said bottom housing and surrounding part of and spaced from said rod for substantially the entire length thereof, a high level probe vertically and concentrically threaded in said tapped bottom plug lower opening of said calibration housing, said high level probe including a second conducting rod extending into said calibration bore and a second insulating sleeve concentrically surrounding said second rod throughout substantially the entire vertical length of said bottom plug, the top of said bottom plug and the top of said second insulating sleeve being substantially on a level with the top of said sight portion, said bottom housing, bottom plug, conduit and calibration housing being electrically conductive and connectable to a common conductor, said high and low level probes and said common conductor adapted to be connected to said alarm mechanism input, both of said probes adapted to be immersed in a first liquid having a relatively high specific gravity for normal liquid levels in said tank, said low and high level probes adapted to be contacted by a second liquid having a relatively lower specific gravity for low and high, respectively, liquid levels in said tank, said first and second liquids having different electrical resistivities, said liquids subject to being contaminated by foreign substances, and movement of said liquids being longitudinal of said rods and sleeves to wash clean said probes of foreign substances to inhibit false alarms.

7. A remote indicating manometer for indicating the liquid level in a tank comprising a gauge tube, a top and a bottom housing connected to the ends of said gauge tube, a calibration housing having an upper opening and a bottom plug having lower and lower side openings, said bottom housing having lower and side openings, a conduit interconnecting said two side openings, conduit means hydrostatically connecting said upper opening and said top housing to said tank for obtaining a differential hydrostatic pressure, said calibration housing having a surface defining a precision bore, said lower openings being substantially concentric with the bores in said gauge tube and calibration housing, respectively, a first probe concentrically disposed in said lower opening of said bottom housing, said probe including a conducting rod extending into said gauge tube and an insulating sleeve concentrically surrounding said rod throughout substantially the entire length of said bottom housing, a conducting ground sleeve connected to said bottom housing and surrounding part of and spaced from said rod for substantially the entire exposed length thereof, a second probe concentrically disposed in said bottom plug lower opening of said calibration housing, said second probe including a second conducting rod extending into said calibration bore and a second insulating sleeve concentrically surrounding said second rod throughout substantially the entire length of said bottom plug, said bottom housing, bottom plug, and calibration housing being electrically connected to a conductor, an alarm mechanism electrically connected to said first and second probes and to said conductor and responsive to a change in electrical impedance from said conductor to either of said rods to effect an alarm signal, both of said probes adapted to be immersed in a first liquid having a relatively high specific gravity for normal liquid levels in said tank, said probes adapted to be contacted by a second liquid having a relatively lower specific gravity for different liquid levels in said tank, said first and second liquids having different electrical resistivities, said liquid subject to being contaminated by foreign substances, and movement of said liquids being longitudinal of said rods and sleeves to wash clean said probes of foreign substances to inhibit false alarms.

8. A remote indicating manometer for indicating the liquid level in a tank comprising a glass gauge tube, a top and a bottom housing connected to the ends of said gauge tube to establish a sight portion of said tube, a calibration housing having an upper opening and a bottom plug having lower and lower side openings, said bottom housing having lower and side openings, a conduit interconnecting said two side openings, conduit means hydrostatically connecting said upper opening and said top housing to said tank for obtaining a differential hydrostatic pressure with lesser pressure at said calibration housing, said calibration housing having a precision bore, said lower openings being substantially concentric with the bores in said gauge tube and calibration housing, respectively, a low level probe concentrically disposed in said lower opening of said bottom housing, said probe including a conducting rod extending into said sight portion and an insulating sleeve concentrically surrounding said rod throughout substantially the entire length of said bottom housing, a conducting ground sleeve connected to said bottom housing and surrounding part of and spaced from said rod for substantially the entire exposed length thereof, a high level probe concentrically disposed in said bottom plug lower opening of said calibration housing, said high level probe including a second conducting rod extending into said calibration bore and a second insulating sleeve concentrically surrounding said second rod throughout substantially the entire length of said bottom plug, the top of said bottom plug and the top of said second insulating sleeve being substantially on a level with the top of said sight portion, said bottom housing, bottom plug, and calibration housing being electrically connected to a common conductor, an alarm mechanism electrically connected to said high and low level probes and to said common conductor and responsive to a change in electrical impedance from said common conductor to either of said rods to effect an alarm signal, both of said probes adapted to be immersed in a first liquid having a relatively high specific gravity for normal liquid levels in said tank, said low and high level probes adapted to be contacted by a second liquid having a relatively lower specific gravity for low and high, respectively, liquid levels in said tank, said first and second liquids having different electrical resistivities, said liquids subject to being contaminated by foreign substances, and movement of said liquids being longitudinal of said rods and sleeves to wash clean said probes of foreign substances to inhibit false alarms.

9. A remote indicating manometer for indicating the liquid level in a tank comprising a vertically disposed calibrated precision bored glass gauge tube, a top and a bottom housing connected to the ends of said gauge tube to establish a sight portion of said tube, a calibration housing having an upper opening and a bottom plug having lower and lower side openings, said bottom housing having lower and side openings, a conduit interconnecting said two side openings, conduit means hydrostatically connecting said upper opening and said top housing to said tank for obtaining a differential hydrostatic pressure with lesser pressure at said calibration housing, said calibration housing having a precision bore disposed vertically, said lower openings being tapped substantially concentrically with the bores in said gauge tube and calibration housing, respectively, a low level probe vertically and concentrically threaded in said tapped lower opening of said bottom housing, said probe including a conducting rod extending into said sight portion and an insulating sleeve concentrically surrounding said rod throughout substantially the entire vertical length of said bottom housing, a conducting ground sleeve connected to said bottom housing and surrounding part of and spaced from said rod for substantially the entire exposed length thereof, a high level probe vertically and concentrically threaded in said tapped bottom plug lower opening of said calibration housing, said high level probe including a second conducting rod extending into said calibration bore and a second insulating sleeve concentrically surrounding said second rod throughout substantially the entire vertical length of said bottom plug, the top of said bottom plug and the top of said second insulating sleeve being substantially on a level with the top of said sight portion, said bottom housing, bottom plug, conduit and calibration housing being electrically conductive and connected to a common conductor, an alarm mechanism electrically connected to said high and low level probes and to said common conductor and responsive to a change in electrical impedance from said common conductor to either of said rods to effect an alarm signal, both of said probes adapted to be immersed in a first liquid having a relatively high specific gravity for normal liquid levels in said tank, said low and high probes adapted to be contacted by a second liquid having a relatively lower specific gravity for low and high, respectively, liquid levels in said tank, said first and second liquids having different electrical resistivities, said liquids subject to being contaminated by foreign substances, and movement of said liquids being longitudinal of said rods and sleeves to wash clean said probes of foreign substances to inhibit false alarms.

10. A gauge adapted for electrical connection to an indicator mechanism and hydrostatic connection to a reservoir for electrically indicating the liquid level in said reservoir, said gauge comprising a generally U-shaped housing having first and second generally upright legs with bores therein, first and second openings in the bottom of said first and second legs, a first probe longitudinally disposed in said first leg opening, said probe including a first conducting rod extending into said first bore and an insulating sleeve concentrically surrounding said rod for a distance substantially greater than the diameter of said sleeve to leave exposed on end of said first conducting rod, a second probe longitudinally disposed in said second leg opening, said second probe including a second conducting rod extending into said second bore and a second insulating sleeve concentrically surrounding said second rod for a distance substantially greater than the diameter of said sleeve to leave exposed an end of said second conducting rod, said liquid level adapted to vary to positions immersing and uncovering the ends of each of said first and second conducting rods, and said probes adapted to be connected to said indicator mechanism to electrically indicate two different levels of said liquid.

11. A liquid level gauge adapted for electrical connection to an indicator mechanism, said gauge comprising a housing having first and second legs and an offset fluid connection therebetween, first and second surfaces defining bores in said first and second legs, respectively, first and second openings in the bottom of said first and second legs and substantially concentrically aligned with said bores, said offset fluid connection interconnecting the interior of said bores at locations other than at said openings, a first probe concentrically disposed in said first opening of said housing, said probe including a conducting rod extending into said first bore and an insulating sleeve concentrically surrounding said rod for a distance substantially greater than the diameter of said sleeve, a conducting ground sleeve connected to said housing and surrounding part of said rod, a second probe concentrically disposed in said second opening of said housing, said second probe including a second conducting rod extending into said second bore and a second insulating sleeve concentrically surrounding said second rod for a distance substantially greater than the diameter of said sleeve, said ground sleeve and probes and the wall of said second bore being connectable to said indicator mechanism, both of said probes adapted to be contacted by fluid in accordance with different liquid levels to be indicated, said fluid being subject to contamination by foreign substances, and movement of said fluid being longitudinal of said rods and sleeves to wash clean said probes of foreign substances to inhibit false indications.

12. A gauge adapted for electrical connection to an indicator mechanism and hydrostatic connection to a reservoir for electrically indicating the liquid level in said reservoir, said indicator mechanism being responsive to a change in electrical impedance on the input thereof, said gauge comprising a generally U-shaped housing having first and second generally upright legs and an offset fluid connection therebetween, a first surface defining a generally upright calibration bore in said first leg, a first threaded opening in the bottom of said first leg and substantially concentrically aligned with said first bore, the bottom of said first leg being at a level below that of the bottom of said second leg, said offset fluid connection interconnecting the interior of said bores at locations other than at said threaded opening, a probe concentrically threaded in said first opening of said housing, said probe including a conducting rod extending into said first calibration bore and an insulating sleeve concentrically surrounding said rod for a distance greater than the diameter of said sleeve, a common conductor surrounding part of and spaced from said rod for substantially the entire exposed length thereof, said probe and said common conductor adapted to be connected to said indicator mechanism input, said probe adapted to be immersed in a first liquid having a relatively high specific gravity for normal liquid levels in said reservoir and adapted to be contacted by a second liquid having a relatively lower specific gravity for low liquid levels in said reservoir, said first and second liquids having different electrical resistivities, said liquids subject to being contaminated by foreign substances, and movement of said liquids being longitudinal of said rod and sleeves to wash clean said probe of foreign substances to inhibit false indications.

13. A liquid level gauge adapted for electrical connection to an indicator mechanism, said guage comprising a housing having first and second legs and an offset fluid connection therebetween, first and second surfaces defining bores in said first and second legs, respectively, first and second openings in the bottom of said first and second legs and substantially concentrically aligned with said bores, said offset fluid connection interconnecting the interior of said bores at locations other than at said openings, a first probe concentrically disposed in said first opening of said housing, said probe including a conducting rod extending into said first bore and an insulating sleeve concentrically surrounding said rod for a distance substantially greater than the diameter of said sleeve, a second probe concentrically disposed in said second opening of said housing, said second probe including a second conducting rod extending into said second bore and a second insulating sleeve concentrically surrounding said second rod for a distance substantially greater than the diameter of said sleeve, said probes and the walls of said bores being connectable to said indicator mechanism, both of said probes adapted to be contacted by fluid in accordance with different liquid levels to be indicated, said fluid being subject to contamination by foreign substances, and movement of said fluid being longitudinal of said rods and sleeves to wash clean said probes of foreign substances to inhibit false indications.

References Cited in the file of this patent

UNITED STATES PATENTS

| | | |
|---|---|---|
| 290,101 | Page et al. | Dec. 11, 1883 |
| 654,631 | Hays | July 31, 1900 |
| 824,098 | Dawes | June 26, 1906 |
| 1,977,898 | Seniff | Oct. 23, 1934 |
| 2,077,679 | Ernst | Apr. 20, 1937 |
| 2,202,197 | Ewertz | May 28, 1940 |
| 2,678,434 | Brown et al. | May 11, 1954 |

OTHER REFERENCES

Bulletin No. 382 of the Reliance Gauge Column Co. Published in 1938.